United States Patent [19]

Cuffe et al.

[11] 4,127,638

[45] Nov. 28, 1978

[54] PROCESS FOR CASTING POLYMER RODS

[75] Inventors: Patricia M. Cuffe, Dudley; Albert R. LeBoeuf, Sturbridge; Edward A. Travnicek, Southbridge, all of Mass.

[73] Assignee: American Optical Corporation, Southbridge, Mass.

[21] Appl. No.: 722,960

[22] Filed: Sep. 13, 1976

[51] Int. Cl.² .......................... B29C 1/02; B29C 1/04; B29D 11/00
[52] U.S. Cl. .................................... 264/331; 264/1; 264/334; 264/337; 264/338
[58] Field of Search ................. 264/1, 337, 338, 334, 264/331; 260/885

[56] References Cited

U.S. PATENT DOCUMENTS

| | | | |
|---|---|---|---|
| 3,621,079 | 11/1971 | Leeds | 260/885 |
| 3,700,761 | 10/1972 | O'Driscoll | 264/1 |
| 3,839,304 | 10/1974 | Hovey | 264/1 X |
| 3,894,129 | 7/1975 | Hoffman | 264/1 |
| 3,966,847 | 6/1976 | Seiderman | 264/1 X |
| 3,978,164 | 8/1976 | LeBoeuf et al. | 264/1 X |

Primary Examiner—Jan H. Silbaugh
Attorney, Agent, or Firm—Jeremiah J. Duggan; Alan H. Spencer

[57] ABSTRACT

Polymeric rods suitable for manufacturing contact lenses may be improved by casting the rod in Teflon or in a Teflon-coated tube. Contact lens materials containing NVP as a monomer are preferably cast in tubes made of Teflon or having Teflon coating on the interior surface. The rods thus cast are substantially free of strain, have a uniform diameter, a smooth, continous exterior surface and an absence of voids therein. When initial polymerization is conducted at a moderate temperature in a water bath, the mixture is polymerized homogeneously to provide superior uniformity.

5 Claims, No Drawings

PROCESS FOR CASTING POLYMER RODS

BACKGROUND OF THE INVENTION

This invention relates to improvements in casting rods used in the manufacture of contact lenses and intraocular implants. More particularly, this invention relates to casting polymerization mixtures in Teflon tubes or Teflon-coated tubes.

U.S. Pat. No. 3,978,164, issued to LeBoeuf et al., describes casting contact lens material in a Teflon tube lined with a Mylar or a similar film. Certain materials cannot be thus cast and this invention is directed to an improvement in the casting process providing uniform polymerized rods which cannot be cast using the process of the aforementioned patent. In attempting to overcome some of the difficulties encountered in trying to adopt the method of the aforementioned patent to other materials, we tried glass tubes. The tubes were sealed from the atmosphere by appropriate plugs and nonoxidizing atmospheres. In one instance, we used a nitrogen filled balloon about the open end of the tube in which the monomer was cast. While the rods recovered from such a glass casting system were more uniform in composition, they were not more uniform in geometry, quite surprisingly. The rods recovered were noncircular in that they had flat areas along the length of the rod. Also, the glass tubes seemed to become more fragile with repeated use. While not able to fully understand the phenomenon by which this increase in fragility occurs, we postulate a fatigue was induced in the glass. This may have been due to leaching of minor constituents from the glass, or an accumulation of scratches during handling and cleaning.

In any event, we next tried metal tubes of stainless steel and aluminum. We selected these metal tubes because of the desirability of controlling the exothermic reaction which occurs when the mixture is polymerizing. These metal tubes were also not entirely satisfactory. Among other things, non-circular flat areas formed on the cast rods and there was much sticking. Tubes of polyethylene and other polyolefins known to be "slippery" were tried. Polymerization in the polyolefin tubes did not proceed uniformly. Apparently, inhibitors required for polyolefins adversely affect the polymerization of NVP containing monomers. Also, we tried tubes of Teflon. Teflon is the trademark of the DuPont Company for a waxy opaque material called polytetrafluoroethylene. This material has been used, for example, on cooking utensils and in many industrial applications to prevent sticking. The combination of teflon tubes within a copper or aluminum stiffener proved successful in accomplishing the objects of the invention; that is, the reproducible manufacture of a rod used in hard contact lens and intraocular lens precursor manuacture characterized by good machinability, color uniformity and optical quality. Certain Teflon coatings on metal tubing have also accomplished this same end.

BRIEF DESCRIPTION OF THE INVENTION

We have discovered that Teflon tubes or Teflon-coated tubes having smooth interior wall may be used to provide superior polymerized rods cast from materials having substantial shrinkage and significant levels of catalyst. Exemplary of such materials are copolymers of HEMA and NVP, optionally including various amounts of cross-linkers and all modifiers, as well as other copolymers containing NVP. Surprisingly, these materials are not successfully polymerized according to the process of the LeBoeuf et al patent. The materials tend to adhere to Mylar, do not have a uniform diameter and were difficult to remove from the Mylar liner.

Tubes may be of any convenient length, diameter and wall thickness. Tubes in the order of 4 feet in length have been used successfully. Convenient diameters are those of about 0.6 inches inside diameter and about 0.75 inches outside diameter. It is important that the tubes have a smooth interior surface. The smoothness of the interior is critical not only to enable the polymerized rod to be pushed out of the tube but also rough surfaces act as nucleus sites for forming depressions in the surface of the polymerized rod.

DESCRIPTION OF THE PREFERRED EMBODIMENTS

EXAMPLE 1

A reaction mixture was prepared by combining 85.0 parts by weight of 2-hydroxyethyl methacrylate, 15.0 parts by weight of NVP (N-vinyl pyrrolidone), 0.5 parts by weight of ethylene glycol dimethacrylate, and 0.1 part by weight of di-sec-butyl-peroxy dicarbonate. Teflon tubes having a dimension of about 0.6 inches inside diameter with a smooth interior finish and about 0.75 inch outside diameter were sealed at one end with a polyethylene plugs. The reaction mixture was poured into the Teflon tubes which were then loosely covered with polyethylene caps. The tubes containing the polymerizate were supported in a water bath at 27° C for 40 hours to partially polymerize the mixture. The tubes were then placed in a circulating air oven at about 45° C for about 2 hours. The oven temperature was first raised to 70° C for 1 hour and then to 110° C for an additional 24 hours to complete curing.

The cured rods were removed from the Teflon tube by pushing the Teflon tubes down over a metal rod having a diameter less than the ID of the Teflon tube. The rods had a smooth hard texture and uniform cylindrical shape with no voids or surface depressions. The ends of the rod were removed and the remaining portion was suitable for use in forming contact lenses. It is necessary to remove the ends of the rod because materials in the polyethylene bottom plug inhibit polymerization. The top end of the rod was in contact with oxygen from air and it was likewise poorly polymerized. Removal of about 0.50 to 1 inch of rod is normally sufficient.

EXAMPLE 2

A mixture containing 87.0 parts by weight of NVP (N-vinyl pyrrolidone), 13.0 parts by weight of methyl methacrylate, 0.8 parts by weight of allyl methacrylate, and 0.15 parts by weight of t-butyl-2-ethyl hexanoate was prepared and cast according to the procedure of Example 1 except the water bath temperature was 50° C and the tubes were supported therein overnight (for 16 to 20 hours). Curing in the oven was conducted the next morning by heating at 70° C for 2 hours and finally at 110° C for 5 hours. The rods were of good quality and similarly suitable for the manufacture of contact lenses.

When the procedure of Example 2 was repeated except using mixtures of 83 and 76 parts by weight NVP with 17 and 24 parts by weight methyl methacrylate, respectively, the polymerized rods had a smooth uniform surface without depressions and was easily removed from the Teflon tube. Mixtures containing monomeric liquid comprising 50 to 90 parts by weight HEMA, 50 to 10 parts by weight NVP, 0 to 10 parts by weight cross-linker and 0.05 to 0.2 parts by weight catalyst with a water temperature of about 50° C are also contemplated. Other materials which have been polymerized in Teflon and Teflon-coated tubes including mixtures of HEMA and MMA, mixtures of HEMA and NVP modified by MMA. It has normally been found necessary that more than 0.05 parts by weight catalyst per 100 parts by weight monomer be present to overcome oxygen inhibition inherent with the use of Teflon.

What is claimed is:

1. An improved process of casting a substantially strain-free dimensionally stable polymeric rod having a uniform diameter which comprises,
    A. Substantially filling a cylindrical polytetrafluoroethylene tube having a smooth interior surface and a temporary closure at one end with a monomeric liquid containing about 10 to 87 parts by weight N-vinyl pyrrolidone, about 90 to 13 parts by weight of a monomer selected from the group consisting of 2-hydroxyethyl methacrylate, methyl methacrylate, and mixtures thereof, and at least 0.05 parts by weight catalyst,
    B. Polymerizing the liquid in a water bath of about 25°–75° C until solidified to a rod,
    C. Curing the polymerized rod at an elevated temperature, and
    D. Removing the cured rod from an end of said tube.

2. The improved process of claim 1 wherein said monomeric liquid comprises 50 to 90 parts by weight HEMA, 50 to 10 parts by weight NVP, 0 to 10 parts by weight cross-linker and 0.05 to 0.2 parts by weight catalyst with a water temperature of about 50° C.

3. The improved process of claim 1 wherein said monomeric liquid comprises about 85 parts by weight HEMA, about 15 parts by weight NVP, about 0.5 parts by weight ethylene glycol dimethacrylate and 0.1 part by weight di-sec-butyl peroxydicarbonate with a water temperature of about 25° C.

4. The improved process of claim 1 wherein said monomeric liquid comprises about 87 parts by weight NVP, about 13 parts by weight NMA, about 0.8 parts by weight allyl methacrylate and 0.15 parts by weight t-butyl-2-ethylhexanoate.

5. The process of claim 1 wherein the tube has an outer shell of metal.